(12) United States Patent
Nakagawa et al.

(10) Patent No.: US 9,308,595 B2
(45) Date of Patent: Apr. 12, 2016

(54) AUTOMATIC WIRE-THREADING DEVICE

(75) Inventors: Takayuki Nakagawa, Chiyoda-ku (JP); Yuhei Domori, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 686 days.

(21) Appl. No.: 13/700,951

(22) PCT Filed: Jan. 30, 2012

(86) PCT No.: PCT/JP2012/051972
§ 371 (c)(1),
(2), (4) Date: Nov. 29, 2012

(87) PCT Pub. No.: WO2013/114531
PCT Pub. Date: Aug. 8, 2013

(65) Prior Publication Data
US 2013/0193111 A1    Aug. 1, 2013

(51) Int. Cl.
*B23H 11/00* (2006.01)
*B23H 7/10* (2006.01)

(52) U.S. Cl.
CPC ............... *B23H 11/00* (2013.01); *B23H 7/102* (2013.01)

(58) Field of Classification Search
CPC ............................. B23H 7/102; B23H 11/00
USPC .................. 219/69.12, 69.17, 137.71, 137.2
See application file for complete search history.

(56) References Cited

U.S. PATENT DOCUMENTS 5,796,063 A * 8/1998 Maidagan .................. 219/69.12

FOREIGN PATENT DOCUMENTS

| JP | 58-177234 A | 10/1983 |
|---|---|---|
| JP | 02-116423 A | 5/1990 |
| JP | 06-055359 A | 3/1994 |
| JP | 06-079537 A | 3/1994 |
| JP | 2005-028523 A | 2/2005 |
| JP | 2006-110654 A | 4/2006 |
| JP | 2006-247755 A | 9/2006 |
| JP | 4037490 B2 | 11/2007 |
| JP | 4849810 B2 | 10/2011 |

* cited by examiner

*Primary Examiner* — Thien S Tran
(74) *Attorney, Agent, or Firm* — Sughrue Mion, PLLC; Richard C. Turner

(57) ABSTRACT

The automatic wire-threading device includes a wire feed motor that drives a wire feed roller in a feeding direction, a wire-feed-motor control unit that outputs a feeding-direction rotation-speed reference to the wire feed motor at a time of a threading operation of a wire electrode and that reduces torque in a feeding direction when a detected rotation speed of the wire feed roller is larger than the feeding-direction rotation-speed reference, a wire collecting motor that drives a wire collecting roller in a collecting direction, and a wire-collecting-motor control unit that outputs a predetermined wire-collecting-roller speed reference to the wire collecting motor to collect a wire. The wire-feed-motor control unit limits torque so that an absolute value of motor torque in a winding-back direction of a wire feed roller is smaller than an absolute value of motor torque in a feeding direction.

9 Claims, 9 Drawing Sheets

AUTOMATIC WIRE-THREADING DEVICE

CROSS REFERENCE TO RELATED APPLICATIONS

This application is a National Stage of International Application No. PCT/JP2012/051972, filed on Jan. 30, 2012, the contents of all of which are incorporated herein by reference in their entirety.

FIELD

The present invention relates to a wire electric-discharge machining device that repeatedly generates electric discharge between a workpiece and a wire-shaped machining electrode so as to remove a part of the workpiece or cut the workpiece, and more particularly to an automatic threading device that automatically performs threading of a wire electrode from a wire feed roller to a wire collecting roller.

BACKGROUND

According to a conventional automatic wire-threading device, when a wire feed roller feeds a wire at a referenced speed and it is detected that wire-threading is completed by a signal of a detector, a control scheme of the wire feed roller is switched so that wire tension becomes equal to referenced tension (for example, Patent Literature 1).

Furthermore, to prevent disconnection of a thin wire electrode, automatic wire-threading is performed by a first unit that feeds a wire from a wire feed roller while opening a wire collecting roller, a second unit that closes the wire collecting roller after the wire is fed with a set distance, and a third unit that determines whether wire-threading is completed by detecting rotation of a roller while generating small tension in the wire (for example, Patent Literature 2).

CITATION LIST

Patent Literatures

Patent Literature 1: Japanese Patent No. 4037490
Patent Literature 2: Japanese Patent No. 4849810

SUMMARY

Technical Problem

According to these wire electric-discharge machining devices, in a state where a wire feed roller feeds a wire by a speed-reference control scheme, when a distal end of the wire electrode reaches a wire collecting roller and the wire collecting roller pulls the wire at a higher speed than that of the wire feed roller, the wire feed roller rotates at a higher speed than a reference speed and thus a control system of a wire feed motor generates large torque in a winding-back direction to decelerate the wire feed roller. Particularly when it takes a long time before detecting that wire-threading is completed or when a processing time for switching the control scheme of the wire feed motor to a wire-tension control scheme is extended, the wire tension can become excessive and the wire electrode can be disconnected.

In addition, in the system of feeding a wire electrode while opening a wire collecting roller, it can take a long time to open and close the wire collecting roller or to feed the wire electrode sufficiently further than the collecting roller and thus an automatic wire-threading time can be extended.

The present invention has been achieved in view of the above problems, and an object of the present invention is to automatically perform threading in a short time without disconnecting a wire electrode even when a thin wire electrode is used.

Solution to Problem

There is provided an automatic wire-threading device of a wire electric-discharge machining device, the automatic wire-threading device comprising: a wire feed motor that drives a wire feed roller in a feeding direction; a wire-feed-motor control unit that outputs a feeding-direction rotation-speed reference to the wire feed motor at a time of a threading operation of a wire electrode, and that reduces torque in a feeding direction when a detected rotation speed of the wire feed roller is larger than the feeding-direction rotation-speed reference; a wire collecting motor that drives a wire collecting roller in a collecting direction; and a wire-collecting-motor control unit that outputs a predetermined wire-collecting-roller speed reference to the wire collecting motor to collect a wire, wherein the automatic wire-threading device performs a threading operation of the wire electrode from the wire feed roller to the wire collecting roller, and the wire-feed-motor control unit limits torque so that an absolute value of motor torque in a winding-back direction of the wire feed roller is smaller than an absolute value of motor torque in a feeding direction.

Advantageous Effects of Invention

According to the present invention, it is possible to prevent disconnection of a wire after the wire is threaded to a wire collecting roller.

Furthermore, because automatic threading can be performed without switching a control scheme, the wire-threading time can be reduced, and a wire moving speed can be also increased and thus the wire-threading time can be reduced.

DESCRIPTION OF EMBODIMENTS

First Embodiment

Figure 1:
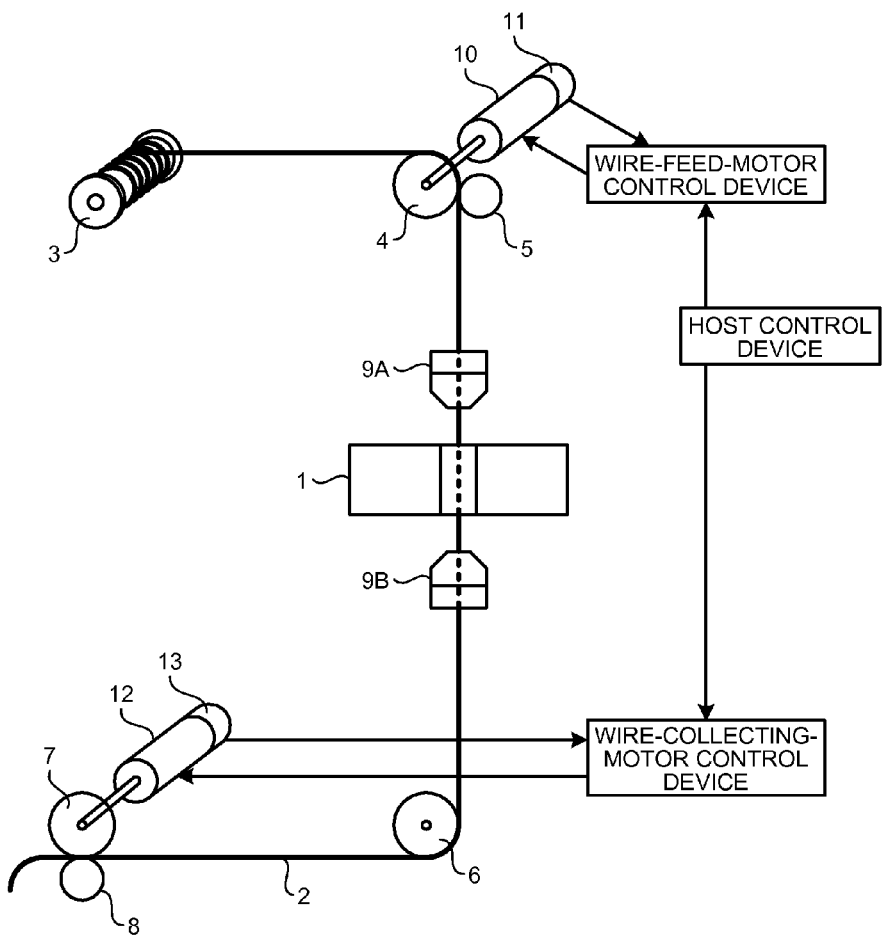
FIG. 1 is a schematic diagram of an automatic wire-threading device according to a first embodiment.

FIG. 1 is a schematic diagram of an automatic wire-threading device according to a first embodiment of the present invention.

A wire electrode 2 drawn out from a wire bobbin 3 is fed while being sandwiched by a wire feed roller 4 and a feed pinch roller 5, passed through an upper wire guide 9A, a workpiece 1, a lower wire guide 9B, and a guide roller 6, and externally led out while being sandwiched by a wire collecting roller 7 and a collecting pinch roller 8.

The wire feed roller 4 is connected to a wire feed motor 10, and a wire-feed-motor controller detects a rotation angle by fetching an output from a wire-feed-motor detector 11 included in the wire feed motor 10 to control a rotation angle or torque of the wire feed motor 10.

The wire collecting roller 7 is connected to a wire collecting motor 12, a rotation angle from a wire-collecting-motor detector 13 included in the wire collecting motor 12 is fetched and detected, and a wire-collecting-motor controller controls a rotation speed of the wire feed motor 10.

Figure 2:
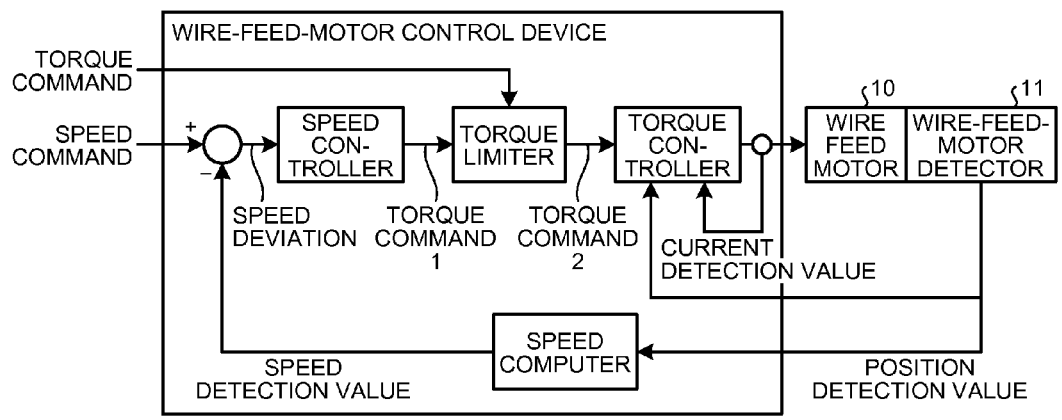
FIG. 2 is a block diagram of a wire-feed-motor controller of the automatic wire-threading device according to the first embodiment.

FIG. 2 is a block diagram of the wire-feed-motor controller of the automatic wire-threading device and its periphery according to the first embodiment of the present invention.

The wire-feed motor controller receives a speed reference of a wire feed motor, a feeding-direction torque-limiting value A, and a winding-direction torque-limiting value B serving as a disconnection limit of wire tension, from a host controller.

The wire-feed-motor controller computes a speed feedback from a position feedback received from the wire-feed-motor detector 11 and calculates a speed deviation serving as a difference with respect to the speed reference received from the host controller.

Next, a speed controller calculates a torque reference 1 according to the speed deviation.

Subsequently, based on the torque limiting value A and the torque limiting value B received from the host controller and the torque reference 1 from the speed controller, a torque limiter outputs a torque reference 2.

While fetching a position detected signal received from the wire-feed-motor detector 11, the torque reference 2, and a current feedback in which a current supplied to the wire feed motor 10 is detected, a torque controller performs control so that torque generated by the wire feed motor 10 matches the torque reference 2.

Figure 3:
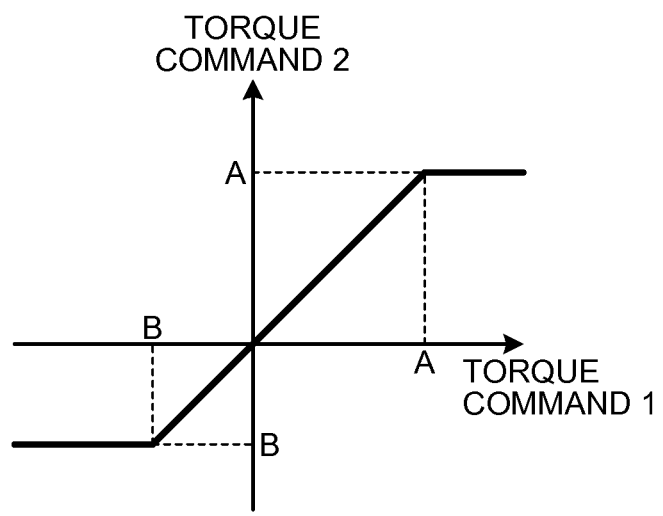
FIG. 3 depicts a processing method in a torque controller of the automatic wire-threading device according to the first embodiment.

FIG. 3 depicts a processing method in the torque controller of the automatic wire-threading device according to the first embodiment of the present invention.

By the feeding-direction torque-limiting value A (A>0) and the winding-back-direction torque-limiting value B (B<0) received from the host controller, when A≤'torque reference 1', 'torque reference 2'=A, when B<'torque reference 1'<A, 'torque reference 2'='torque reference 1', and when 'torque reference 1'≤B, 'torque reference 2'=B.

This example assumes a relationship of |A|≥|B|.

Figure 4:
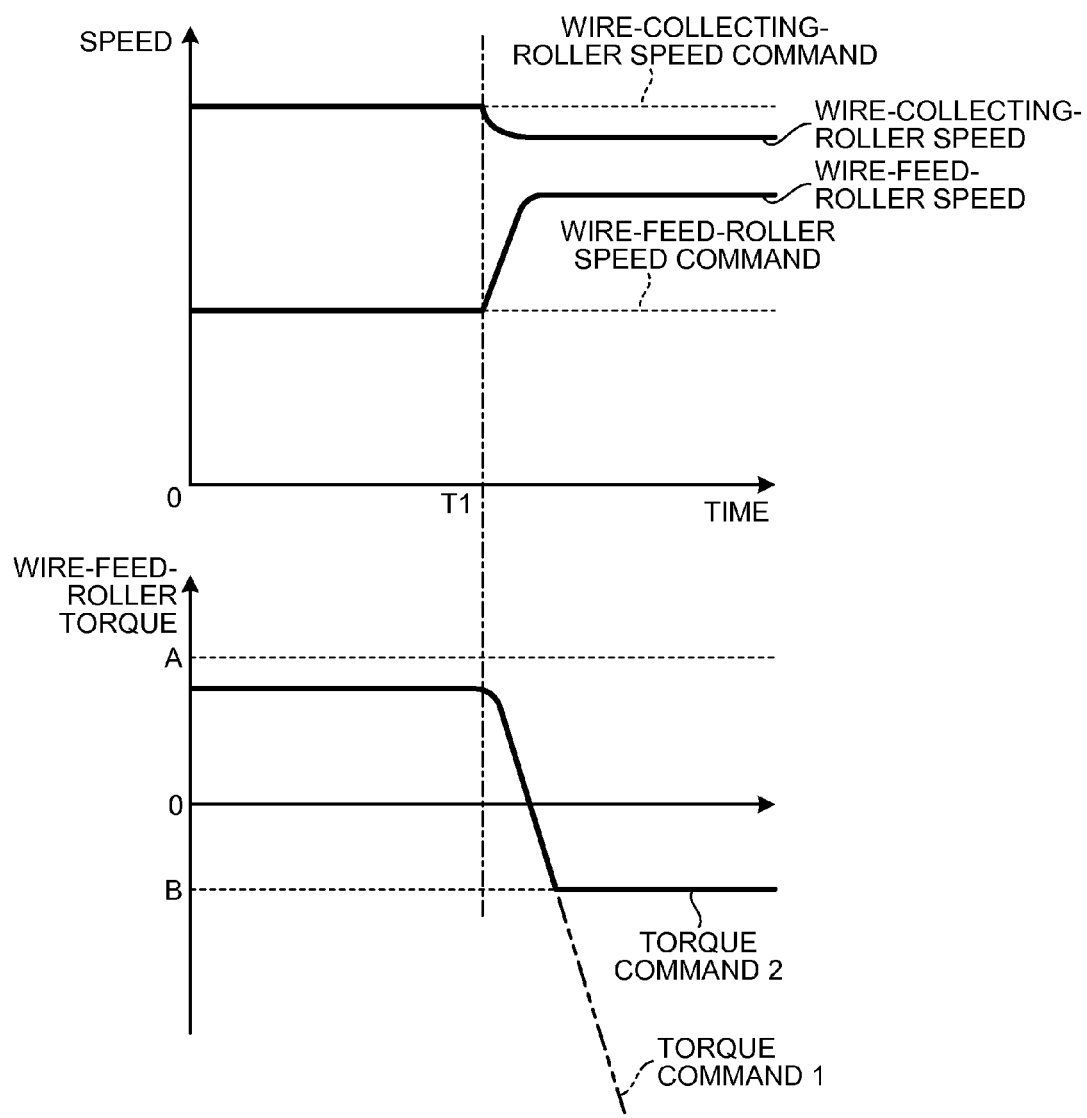
FIG. 4 depicts changes in a speed of a wire feed roller, torque, and a speed of a wire collecting roller in the automatic wire-threading device according to the first embodiment.

FIG. 4 depicts changes in a speed of the wire feed roller, torque, and a speed of the wire collecting roller in the automatic wire-threading device according to the first embodiment of the present invention. FIG. 4 depicts that a distal end of the wire electrode 2 reaches between the wire collecting roller 7 and the collecting pinch roller 8 at a time T1.

According to the present embodiment, a constant wire-collecting-roller speed reference and a constant wire-feed-roller speed reference are given in the entire time span shown in FIG. 4.

This example assumes a relationship of "'wire-collecting-roller speed reference'>'wire-feed-roller speed reference'".

The feeding-direction torque-limiting value A (A>0) limited by maximum currents of a motor and elements incorporated in the controller and the winding-direction torque-limiting value B (B<0) calculated by the disconnection limit of the wire electrode 2 and a friction of the wire bobbin 3, the wire feed roller 4, the wire feed motor 10, the feed pinch roller 5, the upper wire guide 9A, the workplace 1, the lower wire guide 9B, the guide roller 6, the wire collecting roller 7, the wire collecting motor 12, and the collecting pinch roller 8 are passed from the host controller to the wire-feed-motor controller.

With reference to FIG. 4, the wire feed roller 4 and the wire collecting roller 7 operate at a speed substantially matching a reference speed until the time T1. Wire-feed-roller torque at this time is smaller than A in the feeding direction and substantially constant.

After the time T1, when threading is completed, the wire electrode 2 is pulled by the wire collecting roller 7 and the collecting pinch roller 8. Accordingly, the tension of the wire electrode 2 is increased and a wire-collecting-roller speed is slightly slower than the reference.

Meanwhile, because torque is limited in the winding-back direction of the wire feed roller, a decrement of the wire-collecting-roller speed is substantially zero and an increment of the wire feed roller is large, so that a wire-feed-roller speed is larger than the reference.

According to the present embodiment, completion of threading of the wire electrode is determined when the wire-feed-roller speed is maintained to be larger than the wire-feed-roller reference speed for a predetermined time (for example, about 2 seconds). The predetermined time is set as sufficient time for expansion and contraction occurred by the wire electrode being pulled by the wire collecting roller at the time of threading to converge.

Because a detected speed is larger than the speed reference, the speed controller in the wire-feed-motor controller changes the torque reference 1 so that an absolute value of the torque reference 1 is large in its negative value to reduce the speed. According to an embodiment of the present invention, the torque limiter limits the torque reference 2 so as to be equal to or larger than the torque limiting value B.

According to this configuration, because an absolute value of the torque limiting value B is set to be smaller than an absolute value of the torque limiting value A in view of the disconnection limit of the wire electrode 2 and the friction of the wire bobbin 3, the wire feed roller 4, the wire feed motor 10, the feed pinch roller 5, the upper wire guide 9A, the workpiece 1, the lower wire guide 9B, the guide roller 6, the wire collecting roller 7, the wire collecting motor 12, and the collecting pinch roller 8, no excessive wire tension is generated without switching the control scheme even after the distal end of the wire electrode 2 reaches a part that the wire collecting roller 7 contacts the collecting pinch roller 8. Consequently, even when a wire feed speed increases, automatic threading is possible without disconnecting the wire electrode 2.

Furthermore, disconnection of a wire after wire-threading is performed to the wire collecting roller can be prevented without separately providing a sensor that detects completion of threading.

Second Embodiment

Figure 5:
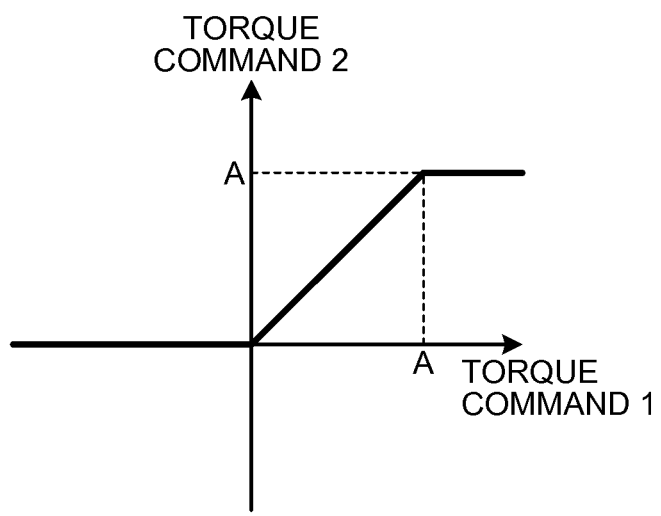
FIG. 5 depicts a processing method in a torque controller of an automatic wire-threading device according to a second embodiment.

FIG. 5 depicts a processing method in a torque controller of an automatic wire-threading device according to a second embodiment of the present invention.

By the feeding-direction torque-limiting value A (A>0) received from the host controller, when A≤'torque reference 1', 'torque reference 2'=A, when 0<'torque reference 1'<A, 'torque reference 2'='torque reference 1', and when 'torque reference 1'≤0, 'torque reference 2'=0.

Figure 6:
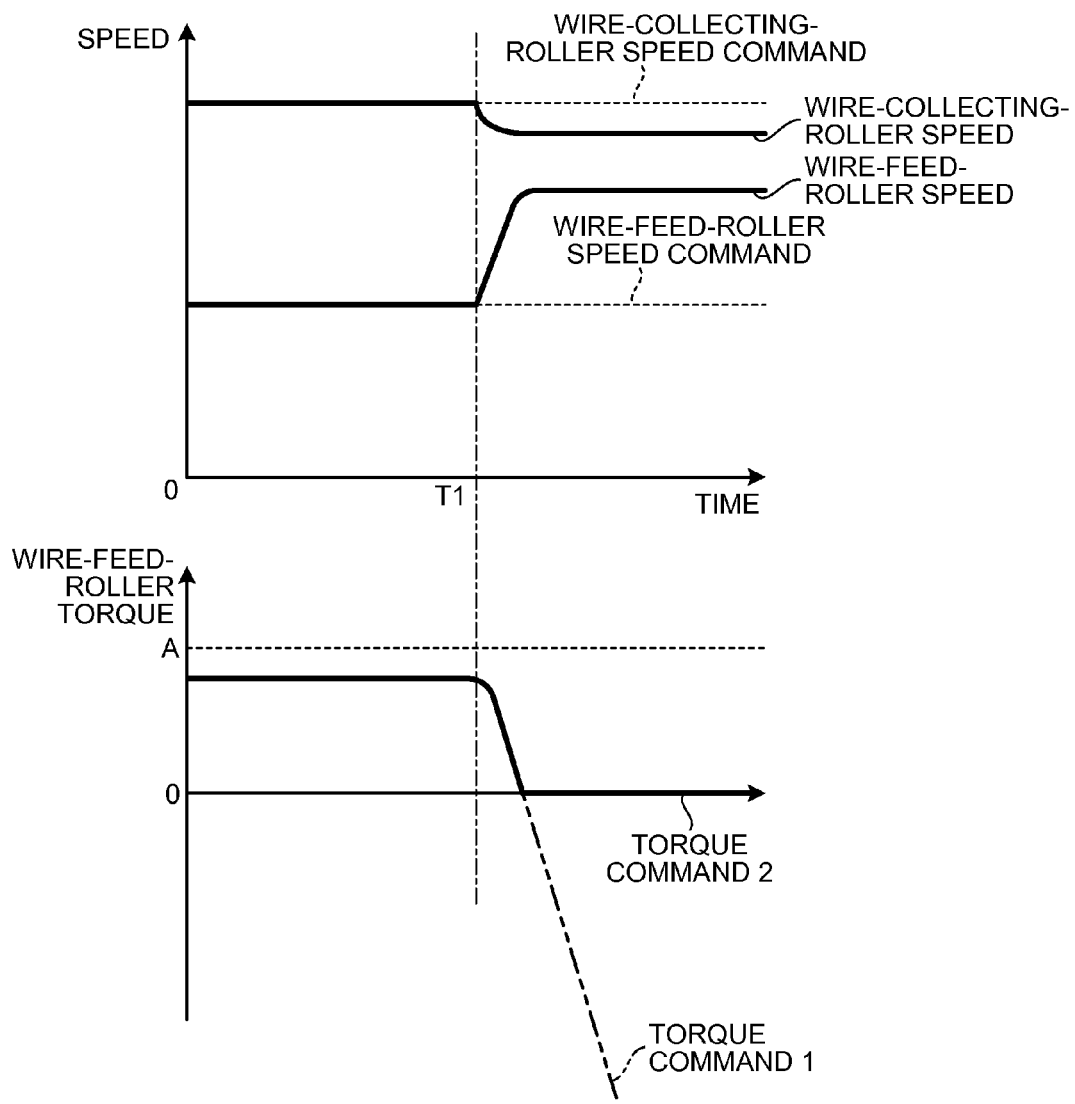
FIG. 6 depicts changes in a speed of a wire feed roller, torque, and a speed of a wire collecting roller in the automatic wire-threading device according to the second embodiment.

FIG. 6 depicts changes in a speed of a wire feed roller, torque, and a speed of a wire collecting roller in the automatic wire-threading device according to the second embodiment of the present invention. The distal end of the wire electrode 2 reaches between the wire collecting roller 7 and the collecting pinch roller 8 at the time T1.

According to the present embodiment, a constant wire-collecting-roller speed reference and a constant wire-feed-roller speed reference are given in the entire time span shown in FIG. 6.

This example assumes a relationship of "'wire-collecting-roller speed reference'>'wire-feed-roller speed reference'".

Furthermore, the feeding-direction torque-limiting value A (A>0) limited by maximum currents of a motor and elements incorporated in a controller is passed from the host controller to the wire-feed-motor controller.

With reference to FIG. 6, the wire feed roller and the wire collecting roller operate at a speed equal to a reference speed until the time T1. Wire-feed-roller torque at this time is smaller than A in the feeding direction and substantially constant.

After the time T1, because the wire electrode 2 is pulled by the wire collecting roller 7 and the collecting pinch roller 8, the tension of the wire electrode 2 is increased and a wire-collecting-roller speed is slightly slower than the reference.

Meanwhile, because torque is limited in the winding-back direction of the wire-feed roller, a decrement of the wire-collecting-roller speed is substantially zero and an increment of the wire-feed-roller speed is large, so that a wire-feed-roller speed is larger than the reference.

Because a detected speed is larger than the speed reference, the speed controller in the wire-feed-motor controller changes the torque reference 1 so that an absolute value of the torque reference 1 is large in its negative value to reduce the speed. According to an embodiment of the present invention, the torque limiter limits the torque reference 2 so as to be zero.

According to this configuration, because a wire feed motor does not generate torque in the winding-back direction, the tension of the wire electrode 2 is limited to be a value generated by the friction of the wire bobbin 3, the wire feed roller 4, the wire feed motor 10, the feed pinch roller 5, the upper wire guide 9A, the workpiece 1, the lower wire guide 9B, the guide roller 6, the wire collecting roller 7, the wire collecting motor 12, and the collecting pinch roller 8. Accordingly, even after the distal end of the wire electrode 2 reaches the wire collecting roller 7 and the collecting pinch roller 8, excessive wire tension can be suppressed without switching the control scheme.

Therefore, even when a wire feed speed increases, automatic threading is possible without disconnecting a wire electrode.

Furthermore, because a limiting value depending on the disconnection limit of the wire electrode is not required, the value does not need to be adjusted depending on a wire electrode used, for example, a material for the wire electrode or a diameter of the wire and thus an automatic threading device can be easily configured.

Third Embodiment

Figure 7:
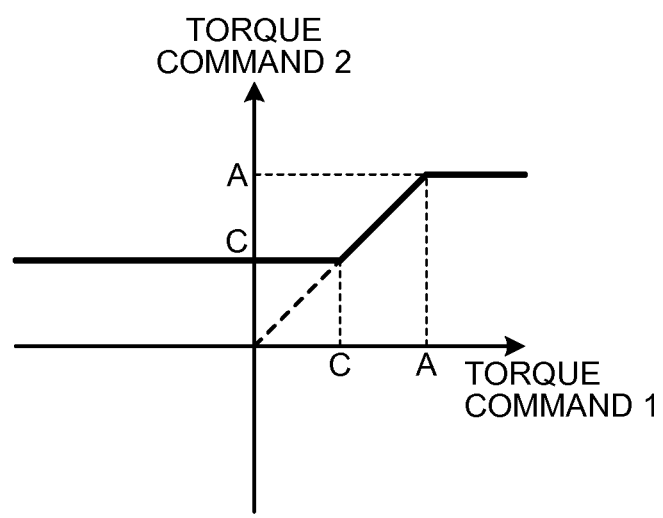
FIG. 7 depicts a processing method in a torque controller of an automatic wire-threading device according to a third embodiment.

FIG. 7 depicts a processing method in a torque controller of an automatic wire-threading device according to a third embodiment of the present invention.

By the feeding-direction torque-limiting value A (A>0) and a lower limit value C (C>0) received from the host controller, when A≤'torque reference 1', 'torque reference 2'=A, when C<'torque reference 1'<A, 'torque reference 2'='torque reference 1', and when 'torque reference 1'≤C, 'torque reference 2'=C.

A torque limiting value C is set in such a manner that, when the total friction of a wire-electrode moving system including the wire feed roller 4, the wire feed motor 10, the feed pinch roller 5, the guide roller 6, the wire collecting roller 7, and the collecting pinch roller 8 exceeds disconnection limit tension of a wire electrode, the torque limiting value C is provided by subtracting the disconnection limit tension of the wire electrode from the total friction of the wire electrode moving system.

Figure 8:
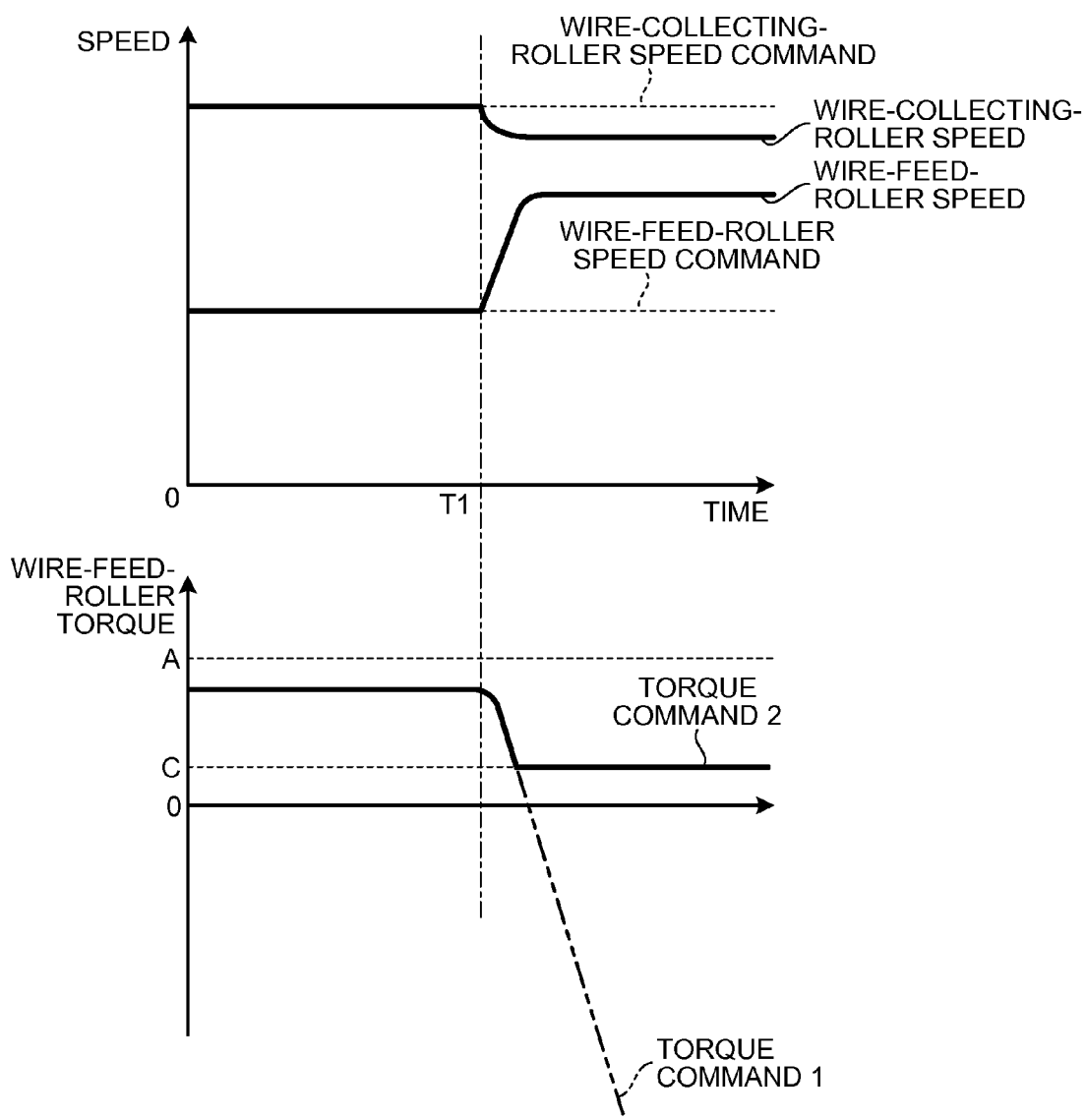
FIG. 8 depicts changes in a speed of a wire feed roller, torque, and a speed of a wire collecting roller in the automatic wire-threading device according to the third embodiment.

FIG. 8 depicts changes in a speed of a wire feed roller, torque, and a speed of a wire collecting roller in the automatic wire-threading device according to the third embodiment of the present invention. The distal end of the wire electrode 2 reaches between the wire collecting roller 7 and the collecting pinch roller 8 at the time T1.

According to the present embodiment, a constant wire-collecting-roller speed reference and a constant wire-feed-roller speed reference are given in the entire time span shown in FIG. 8.

This example assumes a relationship of "'wire-collecting-roller speed reference'>'wire-feed-roller speed reference'".

The feeding-direction torque-limiting value A (A>0) limited by maximum currents of a motor and elements incorporated in a controller and the feeding-direction torque lower-limit value C (C>0) calculated by a friction of the wire feed roller 4, the wire feed motor 10, and the feed pinch roller 5 are passed from the host controller to the wire-feed-motor controller.

The feeding-direction torque lower-limit value C is set to be smaller than the friction of the wire feed roller 4, the wire feed motor 10, and the feed pinch roller 5 so that when the wire-collecting-roller speed reference and the wire-feed-roller speed reference are zero, the wire feed roller is stopped.

With reference to FIG. 8, the wire feed roller and the wire collecting roller operate at a speed equal to a reference speed until the time T1. Wire-feed-roller torque at this time is smaller than A in the feeding direction and substantially constant.

After the time T1, because the wire electrode 2 is pulled by the wire collecting roller 7 and the collecting pinch roller 8, the tension of the wire electrode 2 is increased and a wire-collecting-roller speed is slightly slower than the reference.

Meanwhile, because the wire electrode 2 is pulled by the wire collecting roller 7 rotating at a higher speed than that of the wire feed roller, a wire-feed-roller speed is larger than the reference because of the tension of the wire electrode 2. In other words, because torque of the wire feed roller is limited, a decrement of the wire-collecting-roller speed is substantially zero and an increment of the wire-feed-roller speed is large.

While the speed controller in the wire-feed-motor controller changes the torque reference 1 so that an absolute value of the torque reference 1 is large in its negative value to reduce the speed, the torque limiter limits the torque reference 2 so as to be equal to or larger than the torque limiting value C.

According to this configuration, even when a wire electrode having a material or a diameter that the wire tension generated by the friction of the wire bobbin 3, the wire feed roller 4, the wire feed motor 10, the feed pinch roller 5, the upper wire guide 9A, the workpiece 1 the lower wire guide 9B, the guide roller 6, the wire collecting roller 7, the wire collecting motor 12, and the collecting pinch roller 8 exceeds a disconnection limit is used, automatic threading is possible without disconnection. That is, even when a wire material or a wire diameter having a smaller disconnection limit than a friction of a wire moving path is used, the wire-threading time can be reduced without disconnection.

Fourth Embodiment

Figure 9:
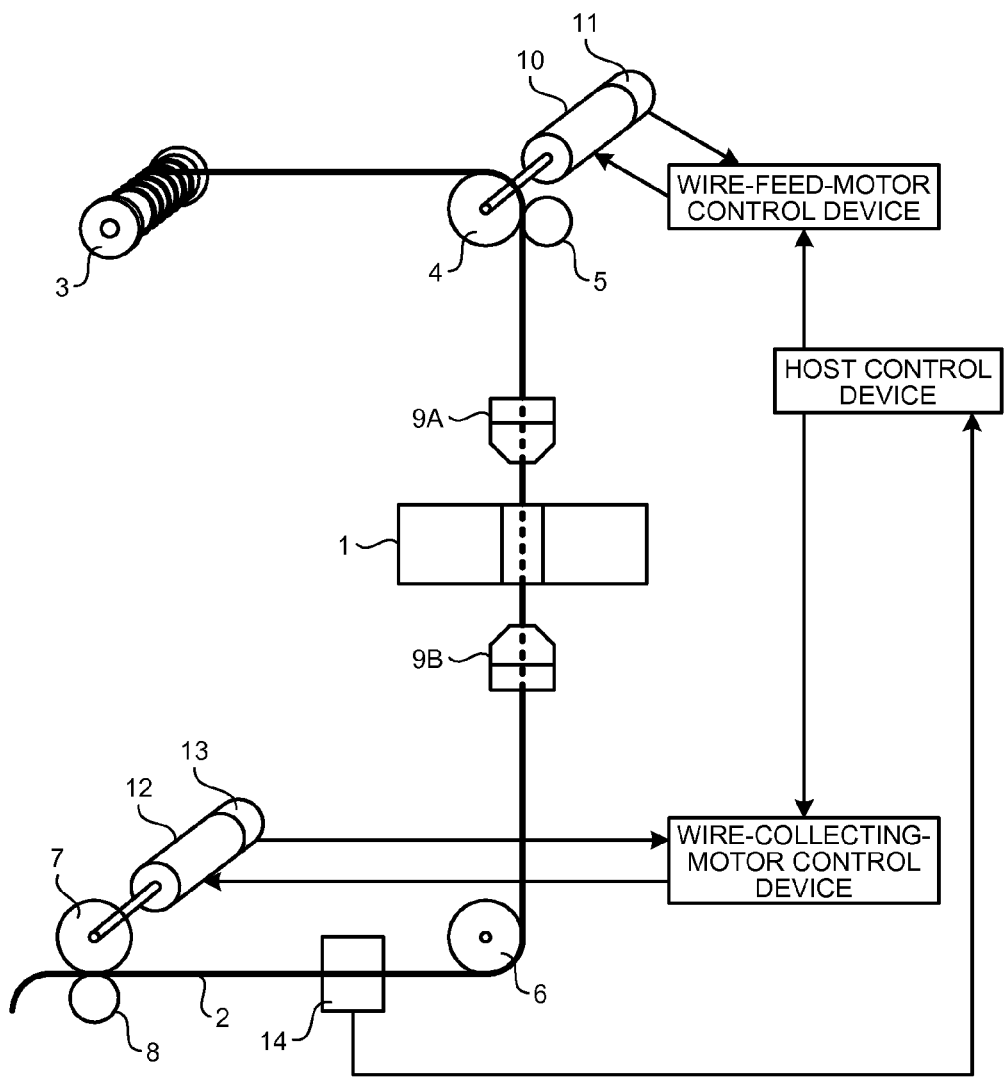
FIG. 9 is a schematic diagram of an automatic wire-threading device according to a fourth embodiment.

FIG. 9 is a schematic diagram of an automatic wire-threading device according to a fourth embodiment of the present invention.

The fourth embodiment is constituted to have a configuration added to that shown in FIG. 1 of the first embodiment described above, where a wire-passing detector 14 is provided between the guide roller 6 and the wire collecting roller 7 to detect passing of the wire electrode 2, thereby sending a detection signal to a host controller.

Figure 10:
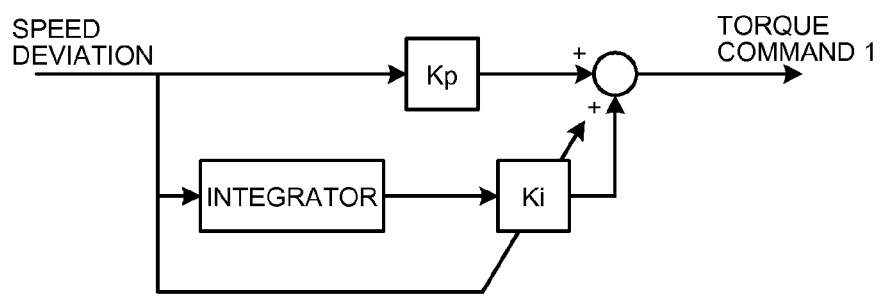
FIG. 10 is a block diagram of a speed controller in a wire-feed-motor controller of the automatic wire-threading device according to the fourth embodiment.

FIG. 10 is a block diagram of a speed controller in a wire-feed-motor controller of the automatic wire-threading device according to the fourth embodiment of the present invention.

The speed controller outputs the torque reference 1 with a speed deviation computed in the wire-feed-motor controller being as an input.

A gain of a proportional term for changing the torque reference 1 in proportion to the speed deviation is indicated by Kp and a gain of an integral term for changing the torque reference 1 by being multiplied by an integral value of the speed deviation is indicated by Ki. Ki is configured to change according to the speed deviation.

Figure 11:
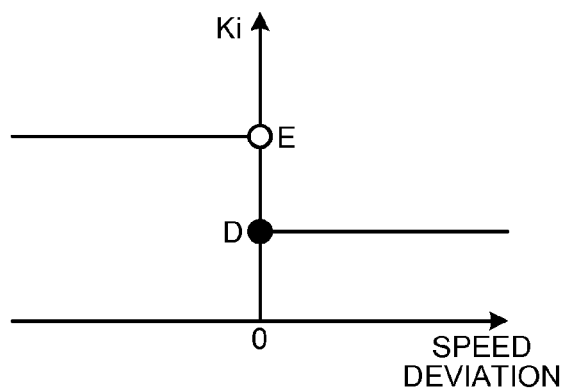
FIG. 11 depicts a relationship between a speed deviation and Ki in the automatic wire-threading device according to the fourth embodiment.

FIG. 11 depicts a relationship between a speed deviation and Ki in the automatic wire-threading device according to the fourth embodiment of the present invention.

Ki is configured to change depending on a sign of the speed deviation so that when the speed deviation≥0, Ki=D (D>0), and when the speed deviation<0, Ki=E (E>0, E>D).

Figure 12:
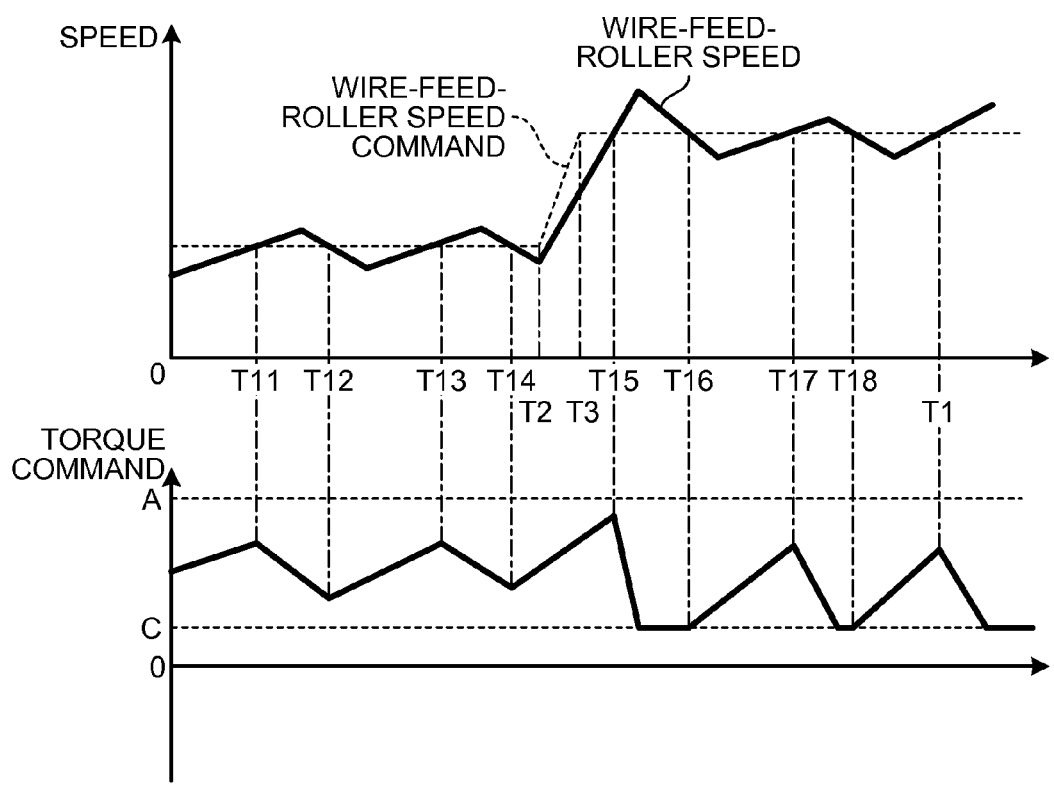
FIG. 12 depicts changes in a wire-feed-roller speed reference, a speed, and torque in the automatic wire-threading device according to the fourth embodiment.

FIG. 12 depicts changes in a wire-feed-roller speed reference, a speed, and torque in the automatic wire-threading device according to the fourth embodiment of the present invention.

According to the above embodiments, explanations have been made under an assumption that the wire-feed-roller speed reference at the time of wire-electrode threading is constant. On the other hand, the present embodiment explains an example in which, when the wire-passing detector 14 detects passing of the wire electrode 2 between the guide roller 6 and the wire collecting roller 7, the wire-feed-roller speed reference is increased to be a steady-state speed after T3 elapses.

From a time 0 to a time T2, to make the distal end of the wire electrode 2 reliably pass through the workpiece 1 and the lower wire guide 9B, the wire-feed-roller speed reference is a low speed. When it is detected that the distal end of the wire electrode 2 reaches the wire-passing detector 14 at the time T2, the host controller increases the wire-feed-roller speed reference from the time T2 to a time T3 to reduce the automatic wire-threading time. At this time, the wire bobbin 4 needs to be also accelerated simultaneously and thus when an amount of change of the wire-feed-roller speed reference becomes excessive, wire tension exceeds a disconnection limit by an influence of inertia of the wire bobbin 3. The wire-feed-roller speed reference is then increased at a gradient that does not disconnect the wire. Furthermore, an increase in the speed is limited so that the speed is equal to or lower than a maximum rotatable speed of the wire collecting roller 7 or the wire feed roller 10.

At the time T1, the distal end of the wire electrode 2 reaches between the wire collecting roller 7 and the collecting pinch roller 8.

From the time 0 to a time T11, T12 to T13, T14 to T15, T16 to T17, and T18 to T1, the wire-feed-roller speed reference is larger than the wire-feed-roller speed. In other time intervals, the speed reference is smaller than the wire-feed-roller speed.

An operation is explained by assuming that Kp=O.

When the wire-feed-roller speed is larger than the wire-feed-roller speed reference, the speed deviation becomes negative and thus Ki=E (E>D) is selected as shown in FIG. 11.

Because a torque reference cannot be applied in the winding-back direction, even when an actual rotation speed is larger than a rotation speed reference, it takes a certain time to reduce the rotation speed. As a result, the actual rotation speed can be more excessive than the rotation speed reference and the control performance is degraded.

Therefore, when the torque reference is reduced as from the time T11 to the time T12, the gradient is large and when the torque reference is increased as from the time T12 to the time T13, the gradient is small.

Note that, because an absolute value of the speed variation is large from the time T2 to the time T15, even when Ki=D is selected, the gradient of the speed is large.

Because the torque reference is equal to "Ki×integral value of speed deviation", the amount of change of torque reference is equal to "Ki×speed deviation". Even when "Ki=D" is selected, the speed deviation is large and thus a change in the torque is large.

According to this configuration, even when it is detected that the distal end of the wire electrode 2 reaches the wire-passing detector 14 and then the speed reference of the wire feed roller 4 is increased, an increase in an overshoot amount serving as an amount of the wire-feed-roller speed exceeding the reference speed can be prevented. Therefore, it is possible to detect that automatic threading is completed by comparing the wire-feed-roller speed to the speed reference without separately providing a detector.

Furthermore, while the wire-passing detector 14 is placed between the guide roller 6 and the wire collecting roller 7, identical effects can be obtained when the wire-passing detector 14 is placed between the lower wire guide 9B and the guide roller 6.

INDUSTRIAL APPLICABILITY

The present invention relates to an automatic wire-threading device and a disconnection preventing technique and a high-speed threading technique can be realized.

REFERENCE SIGNS LIST 1 workpiece, 2 wire electrode, 3 wire bobbin, wire feed roller, 5 feed pinch roller, 6 guide roller, wire collecting roller, 8 collecting pinch roller, 9A upper wire guide, 9B lower wire guide, 10 wire feed motor, wire-feed-motor detector, 12 wire collecting motor, 13 wire-collecting-motor detector, 14 wire-passing detector.

The invention claimed is:

1. An automatic wire-threading device of a wire electric-discharge machining device, the automatic wire-threading device comprising:
   a wire feed motor that drives a wire feed roller in a feeding direction;
   a wire-feed-motor control unit that outputs a feeding-direction rotation-speed reference to the wire feed motor at a time of a threading operation of a wire electrode, and that reduces torque in a feeding direction when a detected rotation speed of the wire feed roller is larger than the feeding-direction rotation-speed reference;
   a wire collecting motor that drives a wire collecting roller in a collecting direction; and
   a wire-collecting-motor control unit that outputs a predetermined wire-collecting-roller speed reference to the wire collecting motor to collect a wire, wherein
   the automatic wire-threading device performs a threading operation of the wire electrode from the wire feed roller to the wire collecting roller, and
   the wire-feed-motor control unit controls torque of the wire feed motor based on a feeding direction torque limiting value and a winding-back direction torque limiting value, an absolute value of the winding-back direction torque limiting value being smaller than an absolute value of the feeding direction torque-limiting value.

2. The automatic wire-threading device according to claim 1, wherein
   the wire-feed-motor control unit detects a rotation speed of the wire feed roller based on an output value of an encoder connected to the wire feed motor, and determines that threading of the wire electrode is performed when the detected rotation speed of the wire feed roller is maintained to be higher than a wire-feed-roller speed reference value for a predetermined time, and thereby performs motor torque control.

3. The automatic wire-threading device according to claim 1, wherein
   the wire-feed-motor control unit controls a current of the wire feed motor so as not to generate torque in a winding-back direction of the wire feed motor.

4. The automatic wire-threading device according to claim 1, wherein
   the wire-feed-motor control unit controls a current of the wire feed motor so as to generate torque of the wire feed motor constantly in a feeding direction.

5. The automatic wire-threading device according to claim 4, wherein
   the wire-feed-motor control unit defines a torque limiting value in a feeding direction by a relationship between a friction force of a wire-electrode moving system and a disconnection limit tension of a wire electrode set in advance to control a current of the wire feed motor, the wire-electrode moving system being constituted by at least a wire feed roller, a feed pinch roller, and a guide roller.

6. The automatic wire-threading device according to claim 5, wherein
   the torque limiting value is a value obtained by subtracting the disconnection limit tension of the wire electrode from the friction force of the wire-electrode moving system.

7. The automatic wire-threading device according to claim 1, wherein
   the wire-feed-motor control unit increases a rotation speed reference of the wire electrode when detecting that the wire electrode passes through a guide roller.

8. The automatic wire-threading device according to claim 1, wherein
   a gradient when wire-feed-motor torque is increased in a winding direction is larger than a gradient when the wire-feed-motor torque is increased in a feeding direction.

9. The automatic wire-threading device according to claim 1, wherein the wire-feed-motor control unit calculates a speed deviation between the detected rotation speed and the feeding-direction rotation-speed reference, generates a torque reference based on the speed deviation, the feeding direction torque limiting value and the winding-back direction torque limiting value, and outputs the torque reference to the wire feed motor so that the torque of the wire feed motor amounts to torque references.

* * * * *